(12) United States Patent
Hite

(10) Patent No.: US 12,277,085 B2
(45) Date of Patent: Apr. 15, 2025

(54) INSTRUMENTATION SYSTEM CONFIGURED WITH A COMMON BASE MODULE

(71) Applicant: Bradford T Hite, Valencia, CA (US)

(72) Inventor: Bradford T Hite, Valencia, CA (US)

( * ) Notice: Subject to any disclaimer, the term of this patent is extended or adjusted under 35 U.S.C. 154(b) by 67 days.

(21) Appl. No.: 18/332,731

(22) Filed: Jun. 10, 2023

(65) Prior Publication Data

US 2024/0411714 A1 Dec. 12, 2024

(51) Int. Cl.
*G06F 13/40* (2006.01)

(52) U.S. Cl.
CPC .................... *G06F 13/4068* (2013.01)

(58) Field of Classification Search
CPC .................................................. G06F 13/4068
See application file for complete search history.

(56) References Cited

U.S. PATENT DOCUMENTS

| 7,080,051 B1* | 7/2006 | Crawford | G06Q 40/12 717/172 |
| 2004/0030809 A1* | 2/2004 | Lozano | G06F 9/4411 710/8 |
| 2021/0240491 A1* | 8/2021 | Downum | G06F 9/4406 |

* cited by examiner

*Primary Examiner* — David E Martinez

(57) ABSTRACT

A unique system for the implementation of different instrumentation type functions using a configurable common base module combined with a family of input/output interface modules is described. More specifically, this invention relates to the usage of a configurable common base module to provide timing/control signals for different input/output interface modules each combining to form a unique instrumentation function or feature. Some examples of instrumentation functions which can be implemented with the invention include: Data Acquisition, Digital Oscilloscope, Logic Analyzer, Arbitrary Waveform Generator, Spectrum Analyzer, Pattern Generator, and Serial Protocol Analyzer.

12 Claims, 5 Drawing Sheets

Instrumentation System Block Diagram

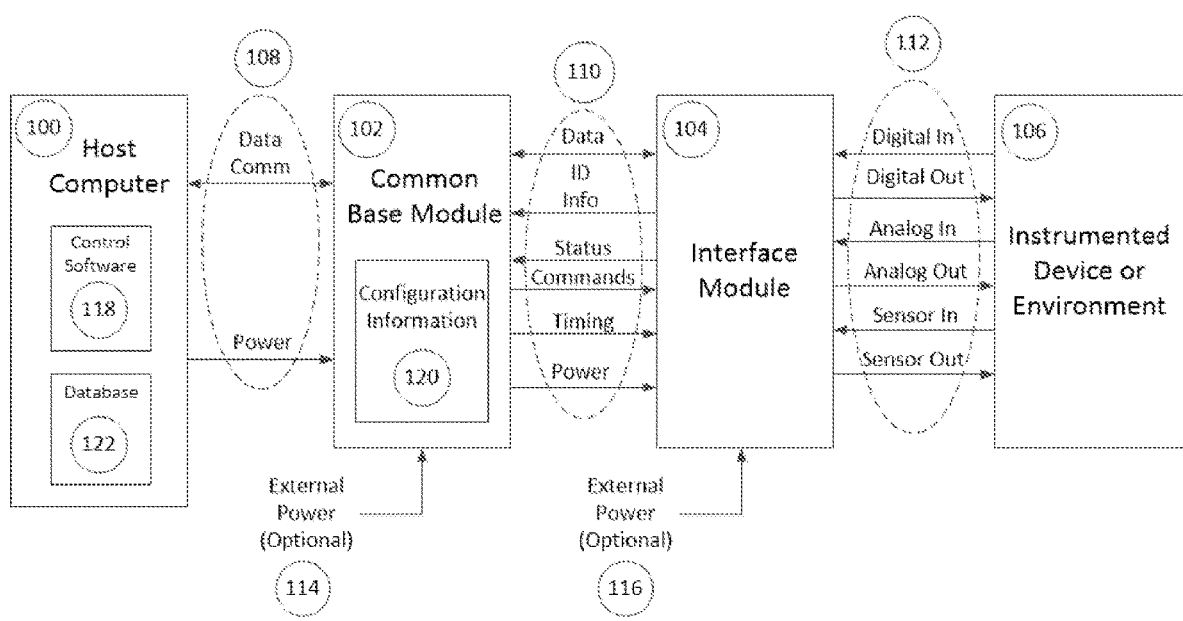
FIG 1 – Instrumentation System Block Diagram

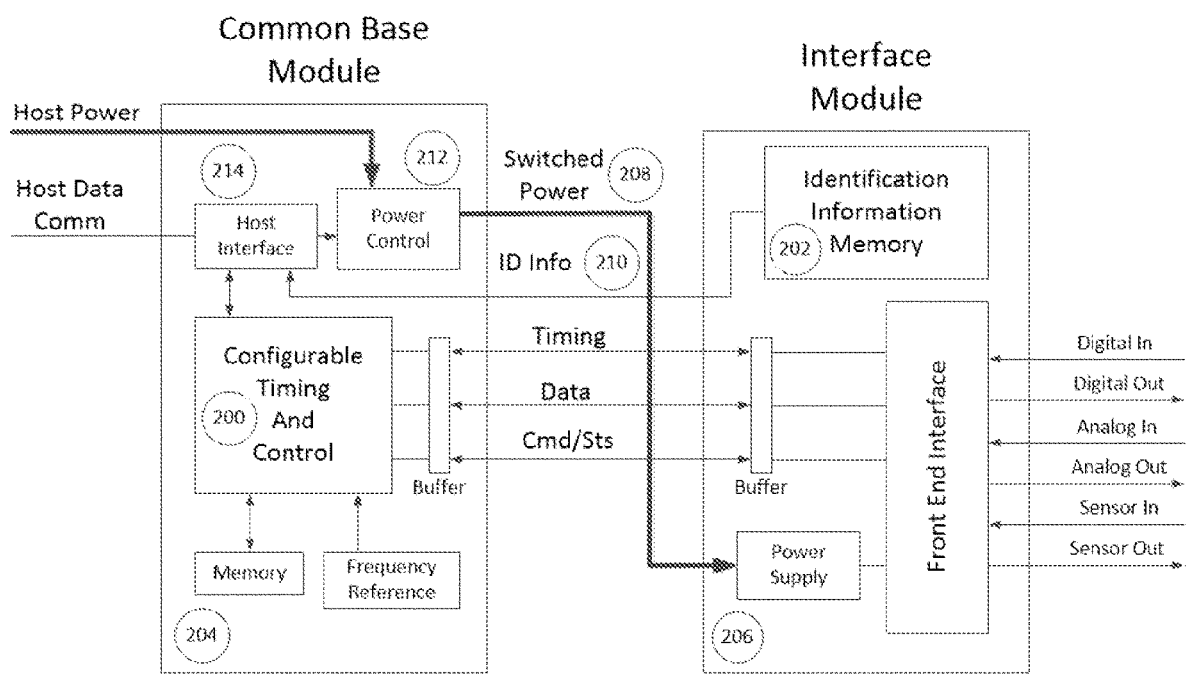
FIG 2 – Common Base Module and Interface Module Functional Block Diagram

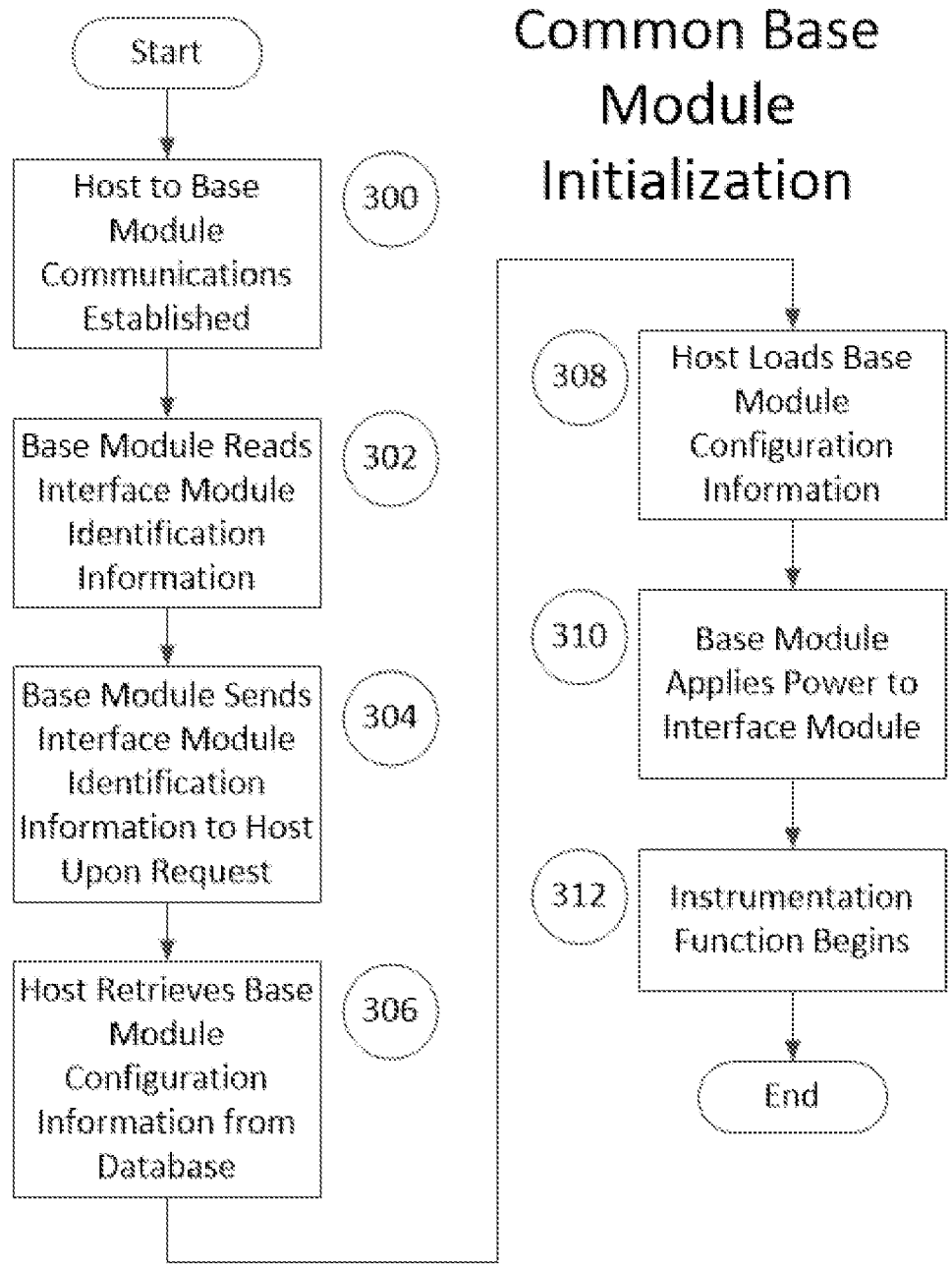
FIG 3 – Instrumentation System Configuration Flow Chart

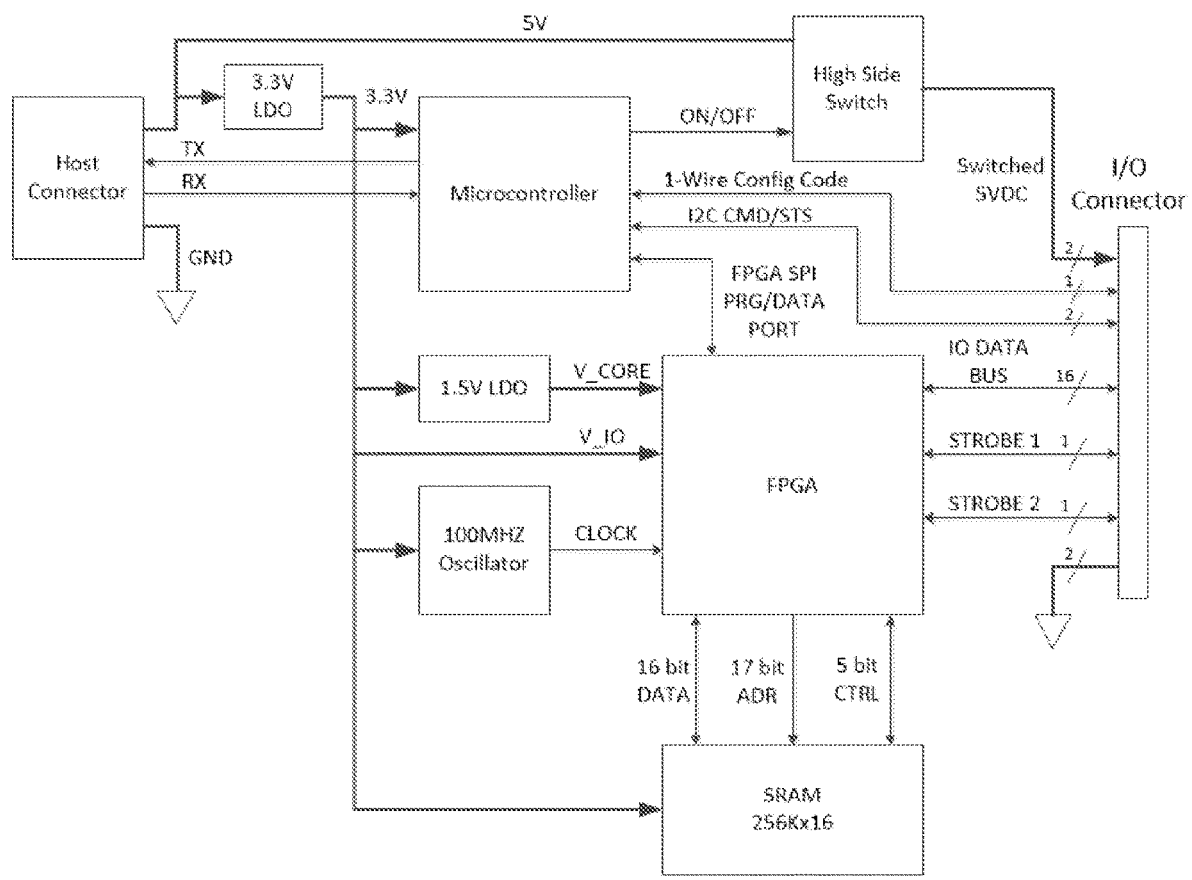
FIG 4 – Example Common Base Module Schematic Diagram

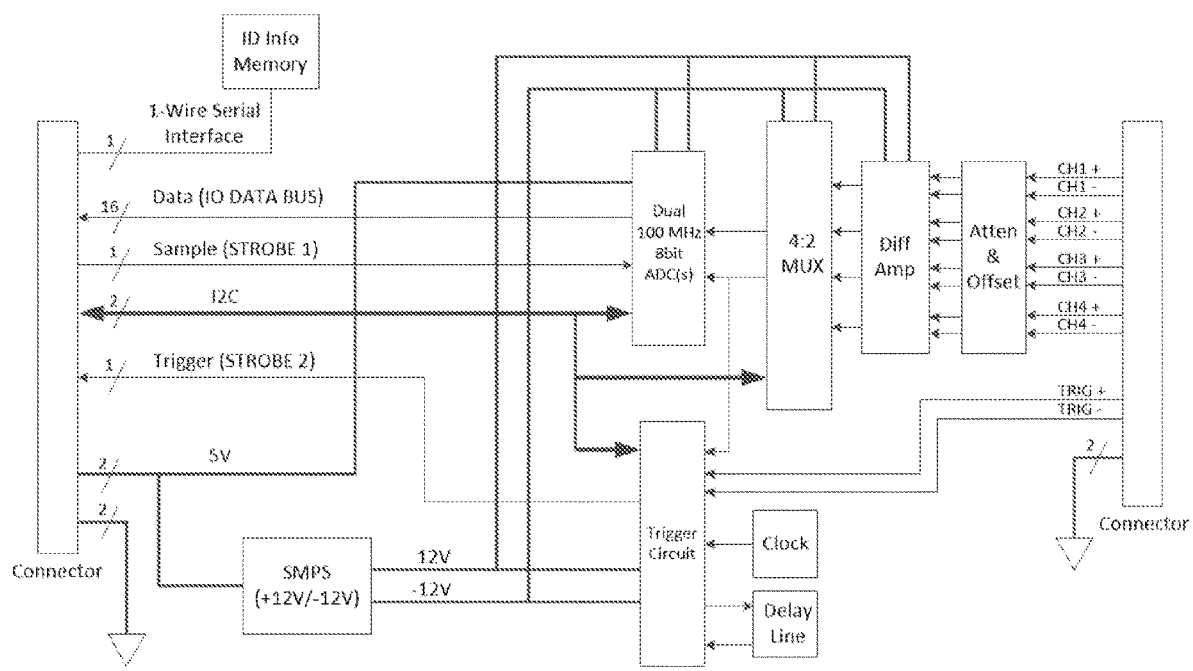
FIG 5 – Example Oscilloscope Interface Module Schematic Diagram

INSTRUMENTATION SYSTEM CONFIGURED WITH A COMMON BASE MODULE

BACKGROUND OF THE INVENTION

1. Field of the Invention

This invention relates to the field of computer-based instrumentation systems. Specifically, a method and system for the implementation of different instrumentation type functions using a configurable common base module combined with a family of input/output interface modules. More specifically, this invention relates to the usage of a configurable common base module to provide timing/control signals for different input/output interface modules each combining to form a unique instrumentation function or feature. Some example applications of instrumentation functions which can be implemented with the invention include: Data Acquisition, Digital Oscilloscope, Logic Analyzer, Waveform Generator, Pattern Generator, and Serial Protocol Analyzer.

2. Description of the Related Art

There are many known system configurations used within the modular computer-based instrumentation field. Most of these configurations are based around a mechanical multi-slot chassis with integrated electrical backplane supporting plug-in circuit card modules. Chassis and backplane elements can be proprietary or standards based allowing usage of modules from various suppliers. Backplane standards commonly found within the instrumentation field are VPX, VME, Compact PCI and several others. Various manufacturers offer an assortment of plug-in boards or complete systems used to build up application specific system configurations. One good example is the VME backplane, which supplies power, communication, timing and control signals to multiple plug-in circuit cards. The plug-in circuit cards typically comprise of a network interface, processor and several analog/digital input interfaces configured as a custom instrumentation system. The processor card contains software to sample the analog/digital inputs, perform data statistical operations and output results to the network. In these configurations, the plug-in circuit boards rely on the chassis backplane component for all system infrastructure support.

Another well-known alternative to a backplane based instrumentation system is a configuration whereby individual sensor interface modules are connected to the controlling module in a peer-peer network fashion. Communication network standards commonly utilized within this peer-peer configuration are USB, RS-422, Ethernet, PCI-E, and 4-20ma current loop. The individual sensor interface modules are completely self-contained to include all functionality (power, communication, timing and control) necessary to fully support sensor operation. In these configurations, each sensor can be placed remotely from the computer based on cabling interconnections possible with the peer-peer network topology.

In recent years, instrumentation system configuration has moved towards a more automated approach based on the development of network standards. These systems require modules acting as part of an automatic configuration process to contain self capability descriptive data or driver firmware available to a system controller module by network queries. Multiple standards have been developed by both commercial and open source organizations offering variations in such things as programming language, operating system, network topology and security aspects. As an example, the EtherCAT standard based on Ethernet networking has the capability of automatic configuration. Each module in the network contains a "Slave Information File" containing capability information about device functionality and settings. This file is used by a configuration management function to compile network information in an offline mode prior to operational usage. In comparison, several commercially available application building software development platforms can be used to support manual instrumentation system integration. Other highly embedded implementations utilize custom control software written in C or Python to implement system control. With either of these implementations, commonly the manufacturer of interface circuit cards or modules will provide a low level driver software component manually configured as required. This significantly limits reconfiguration flexibility.

Automatic instrumentation system configuration has been addressed in the prior art for differing levels of component integration. Divjak in U.S. Pat. No. 5,444,644 (22 Aug. 1995) titled "Auto-Configured Instrumentation Interface" describes a system with capability to identify different type of input/output sensor devices connected to its inputs. The input devices are described as physical sensor types for example a RTD, Pressure sensor or Potentiometer. In this implementation, a processor performs a systematic analysis by stimulating the input device to determine the sensor type and capability. This configuration is limited to automatic configuration for input device (sensor) types supported by the interface circuitry and not the input interface itself. Several more recent patents cite this reference but are limited to the same concept of sensor input device automatic configuration.

The next level of component integration addressed in prior art is a self contained input/output interface function coupled between the controlling module and physical sensor. Matsuura in U.S. Pat. No. 6,301,508 (9 Oct. 2001) titled "Automatic Instrumentation System" describes a system of controller and instrument modules connected by a communication line link. The controller module queries each instrument module over the communication link and receives a unique executable control program for module interfacing. These control programs are stored on a memory within each individual instrumentation module allowing the controller to perform an automatic system configuration. This method of configuration is analogous to the method described above whereby each interface module contains configuration information accessed by the control module. Slattery et al in U.S. Pat. No. 10,181,853 (15 Jan. 2019) titled "Configurable Hardware Platform for Measurement or Control" describes a system whereby a control circuit receives configuration information from an interface circuit used to configure the interface circuit. The configuration information is described as a "table" or "information stored in registers or a memory". Configuration information received by the control circuit contains detailed modes/capabilities supported by the interface circuit thereby requiring a more complicated table or file data structure. Paz Lopez et al in US 2014/0148952 (29 May 2014) titled "Central Node and Terminal Instrumentation Node for Self-Configuring and Secure Building Automation System" describes a distributed network concept whereby instrumentation nodes auto configure with a central control node when added to the system. The automatic configuration steps comprise: 1) an instrumentation node sending unsolicited configuration information to the control note, 2) the control node adding the instrumentation node into the network configuration database, and 3) the control node sending control software to the instrumentation node if required. In all of these type systems, configuration information is transferred from a remote interface module to a control module.

BRIEF SUMMARY OF THE INVENTION

The present invention comprises an instrumentation system configured by a common base module for interface with selectable interface modules each providing a unique instrumentation function or feature. The invention provides an automatic hardware and software reconfigurable implementation by connection of the base module to an input/output interface module. Specific electrical signaling required to support each type of interface module electrical requirements (power, communications, timing and control) are provided by the properly configured common base module. Different interface modules are identified through unique identification information retrieved by the base module and transferred to a host computer. The host computer retrieves configuration information from a database based on the identification information. This configuration information is loaded into the common base module to provide the control/timing interface matching interface module configuration. Examples of general interface modules could provide functions for: Analog Input/Output, Digital Input/Output or Sensor interface. Interface modules also can be designed to implement various application specific types of instrumentation equipment for example: Data Acquisition, Digital Oscilloscope, Logic Analyzer, Arbitrary Waveform Generator, Spectrum Analyzer, Pattern Generator or Serial Protocol Analyzer.

BRIEF DESCRIPTION OF THE DRAWINGS

FIG. 1 is a system block diagram for the present invention.

FIG. 2 is a functional block diagram for the common base module and interface module.

FIG. 3 is a flow chart detailing the process steps taken to configure the common base module.

FIG. 4 is a schematic diagram of an example common base module implementation.

FIG. 5 is a schematic diagram of an example oscilloscope interface module.

REFERENCE NUMERALS IN THE DRAWINGS

| 100 | Host Computer Device | 102 | Common Base Module Device |
| 104 | Interface Module Device | 106 | Instrumented Device or Environment |
| 108 | Interface Signals Between Host Computer and Common Base Module | 110 | Interface Signals Between Common Base Module and Interface Module |
| 112 | Interface Signals Between Interface Module and Instrumented Device or Environment | 114 | Optional External Power Coupled to the Common Base Module |
| 116 | Optional External Power Coupled to the Interface Module | 118 | Control Software Executing on Host Computer |
| 120 | Configuration Information Controlling the Common Base Module | 122 | Database Containing Common Base Module Configuration Information |
| 200 | Configurable Timing and Control in the Common Base Module | 202 | Identification Information Memory in the Interface Module |
| 204 | Common Base Module Device | 206 | Interface Module Device |
| 208 | Common Base Module Switched Power to Interface Module | 210 | Identification Information Signal from Interface Module to Common Base Module |
| 212 | Common Base Module Switched Power Control Circuit | 214 | Common Base Module Host Interface Circuit |
| 300 | Process Step to Establish Host Computer to Base Module Communications | 302 | Process Step for Base Module to Read Interface Module Identification Information |
| 304 | Process Step for Base Module to Send Identification Information to Host Computer Upon Request | 306 | Process Step for Host to Retrieve Base Module Configuration Information from Database Based on the Identification Information |
| 308 | Process Step for Host Computer to Load Configuration Information into Base Module | 310 | Process Step for Base Module to Apply Power to Interface Module |
| 312 | Process Step for Instrumentation Functionality to Begin | | |

DETAILED DESCRIPTION OF THE INVENTION

The preferred embodiment system block diagram of the present invention is shown in FIG. 1 as a general interface adaptor. Host Computer 100 is configured to run a Control Software 118 application used to interface with the Common Base Module 102. Interface 108 provides data communications between the Host Computer 100 and Common Base Module 102. Interface 108 can additionally supply operating power to the Common Base Module 102 or be combined with optional External Power 114 for higher power needs. Some example interfaces supporting higher data rate implementations of Interface 108 can include but are not limited to USB, Ethernet and PCIe. Other interface types supporting a lower data rate implementation can include but are not limited to RS422 and 4-20ma current loop. Configuration Information 120 is loaded into the Common Base Module 102 by Host Computer 100 during initialization. Examples of Configuration Information 120 can include but are not limited to Firmware, Software or Parameter type data. Interface 110 provides control functions and data transfers between Interface Module 104 and Common Base Module 102. Interface 110 also supplies switched operating power to the Common Base Module 102 or be combined with optional External Power 116 for higher power needs. Interface 110 also includes an Interface Module 104 identification information signal used to identify the selectable module type. The identification information is unique to each type of different application specific interface modules and accessed during initialization. Examples of identification information can include but are not limited to a binary code or an ASCII string. At initialization, Common Base Module 102 accesses Interface Module 104 retrieving the identification information. The identification information is transferred to Host Computer 100 upon request wherein Control Software 118 accesses Database 122 to retrieve associated Configuration Information 120. Configuration Information 120 is then loaded into Common Base Module 102 to complete the system configuration process. Interface 112 provides differing signal connection to an external Instrumented Device or Environment 106 as determined by the application. Examples of Interface Signals 112 can include but are not limited to Digital In/Out, Analog In/Out, RF In/Out, Sensor In/out or any signals needed to support the instrumentation application. The present invention supports automatic configuration with minimal hardware since only identification information is sent to the host computer.

FIG. 2 shows a more detailed functional block diagram of Common Base Module and Interface Module. Internal components of the Common Base Module 204 can include but are not limited to: 1) host interface circuit for data communications, 2) power control circuit for switched interface module power, 3) configurable logic device for timing/control, 4) memory to store data, 5) frequency reference for timing, and 6) signal conditioning buffers. Internal components of the Interface Module 206 can include but are not limited to: 1) memory to store the identification information, 2) power supply, 3) signal conditioning buffers, and 4) front end interface circuitry. The front end interface circuitry configuration depends on the specific interface module application.

Hardware components shown in FIG. 2 involved in configuration of the Common Base Module 204 by the host computer interface are now described. Initially, the common base module Host Interface 214 will query the interface module Identification Information 210 stored in Identification Information Memory 202. This step is performed without power applied to the entire interface module whereby only the Identification Information Memory 202 is powered separately during the transaction. Upon reception of Identification Information 210, common base module Host Interface 214 transmits the info to Host Computer 100 upon request. The host computer Control Software 118 transmits Configurable Information 200 associated with Identification Information 210 back to the Common Base Module 204 thereby configuring the base module for operation. The base module Host Interface 214 then commands Power Control 212 to apply Switched Power 208 to the Interface Module 206 after configuration is complete. After power is applied, normal operation of the specific instrumentation application can begin.

FIG. 3 shows a flow chart of the process steps involved in configuration of the base module by the host computer. Initially, Host Computer 100 will establish communications with Base Module 102 per step 300. Step 302 is performed next whereby the Base Module 102 reads Identification Information 210 from the Interface Module 104 memory. After identification information reading, the Base Module 102 sends the info back to Host Computer 100 upon request for processing by Control Software 118 per step 304. Next in step 306, the Host Computer 100 retrieves Base Module 102 configuration information from a database based on the identification code. The host will now load Configurable Information 120 into the Base Module 102 per step 308 to properly operate with Interface Module 104. Step 310 is only performed after module configuration whereby the Host Computer 100 commands Base Module 102 to apply Switched Power 208 to the Interface Module 104. Finally, step 312 commences normal instrumentation function for the specific application.

FIG. 4 shows a more detailed embodiment example schematic diagram for implementation of the common base module with interfaces to the host computer and interface module. The microcontroller serves to provide host computer communications, interface module configuration/control and FPGA configuration/control. The FPGA, upon specific interface module type configuration, handles high speed data transfers between the interface module and SRAM. The SRAM is used as high speed storage for reading in or writing out data to the interface module. Signals between the common base module and interface module are programmable I/O configured to interact with a specific interface module type. Control of the interface module during operation is provided by a dedicated I2C serial bus.

FIG. 5 shows a more detailed embodiment example schematic diagram for implementation of a digital oscilloscope type interface module with interfaces to the common base module and external signaling. There are four differential inputs with signal conditioning for attenuation and offsetting followed up by a differential amplifier. The four inputs are multiplexed into a pair of 8 bit analog to digital converter for reading by the common base module FPGA. An additional external differential input for triggering is made available for event detection. The identification information is obtained by the common base module microprocessor from a memory using a standard 1-Wire serial interface. Triggering of the oscilloscope sampling operation is controlled by a dedicated circuit interfacing with the control module.

A first alternate embodiment of the present invention consists of a common base module coupled to the host computer using an USB serial interface. The common base module is powered by the USB interface or can be supplemented with external voltage source for higher consumption applications. This type of embodiment would support high data rate applications.

A second alternate embodiment of the present invention consists of a common base module coupled to the host computer using an Ethernet serial interface. The common base module is powered by the "Power over Ethernet" feature or can be supplemented with external power for higher consumption applications. This type of embodiment would support high data rate applications.

A third alternate embodiment of the present invention consists of a common base module coupled to the host computer using a PCIe serial interface. The common base module is by external power since the standard PCIe interface does not contain a dedicated power capability. This type of embodiment would support high data rate applications.

A fourth alternate embodiment of the present invention consists of a common base module coupled to the host computer using a RS422 serial interface. The common base module can be powered by the RS-422 interface or supplemented with external voltage source for higher consumption applications. This type of embodiment would support low data rate applications.

A fifth alternate embodiment of the present invention consists of a common base module coupled to the host computer using a 4-20ma current loop interface. The common base module can be powered by the 4-20ma current loop interface or supplemented with external voltage source for higher consumption applications. This type of embodiment would support low data rate applications.

The claimed invention is:

1. A self configuring instrumentation system comprising:
   a. a host computer executing control software;
   b. a common base module coupled to the host computer, the common base module generating control information in response to the host computer;
   c. an interface module coupled to the common base module and coupled to an instrumented device or environment, the interface module generating instrumentation data information in response to the common base module;
   d. wherein the common base module is configured to obtain interface module identification information from the un-powered interface module;
   e. wherein the host computer is configured to obtain the interface module identification information from the common base module;
   f. wherein the host computer is configured to retrieve common base module configuration information from a database based on the interface module identification information and load the common base module configuration information into the common base module; and
   g. wherein the common base module is configured to apply power to the interface module after being loaded with the common base module configuration information.

2. The system of claim 1, wherein the interface module is configured as a Digital Oscilloscope.

3. The system of claim 1, wherein the interface module is configured as a Logic Analyzer.

4. The system of claim 1, wherein the interface module is configured as a Waveform Generator.

5. The system of claim 1, wherein the interface module is configured as a Pattern Generator.

6. The system of claim 1, wherein the interface module is configured as a Serial Protocol Analyzer.

7. A method of instrumentation system self configuration comprising:
   a. executing control software on a host computer;
   b. generating control information by a common base module in response to the host computer;
   c. generating instrumentation data information by an interface module in response to the common base module;
   d. transferring interface module identification information from the interface module to the common base module;
   e. transferring the interface module identification information from the common base module to the host computer;
   f. retrieving common base module configuration information from a database based on the interface module identification information;
   g. loading the common base module configurable information into the common base module; and
   h. applying power to the interface module by the common base module after being loaded with the common base configuration information.

8. The method of claim 7, further comprising operating the interface module as a Digital Oscilloscope.

9. The method of claim 7, further comprising operating the interface module as a Logic Analyzer.

10. The method of claim 7, further comprising operating the interface module as a Waveform Generator.

11. The method of claim 7, further comprising operating the interface module as a Pattern Generator.

12. The method of claim 7, further comprising operating the interface module as a Serial Protocol Analyzer.

* * * * *